United States Patent
Koskinen et al.

(10) Patent No.: US 11,019,637 B2
(45) Date of Patent: May 25, 2021

(54) METHOD, APPARATUS AND COMPUTER PROGRAM FOR SCHEDULING IN DUAL CONNECTIVITY SCENARIOS

(71) Applicant: Nokia Solutions and Networks Oy, Espoo (FI)

(72) Inventors: Henri Markus Koskinen, Espoo (FI); Kaisu Iisakkila, Espoo (FI); Tero Henttonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 53 days.

(21) Appl. No.: 15/113,487

(22) PCT Filed: Jan. 24, 2014

(86) PCT No.: PCT/EP2014/051456
§ 371 (c)(1),
(2) Date: Jul. 22, 2016

(87) PCT Pub. No.: WO2015/110175
PCT Pub. Date: Jul. 30, 2015

(65) Prior Publication Data
US 2017/0026982 A1    Jan. 26, 2017

(51) Int. Cl.
*H04W 72/12* (2009.01)
*H04W 28/22* (2009.01)
*H04W 28/18* (2009.01)
*H04W 88/16* (2009.01)

(52) U.S. Cl.
CPC .......... *H04W 72/12* (2013.01); *H04W 28/22* (2013.01); *H04W 28/18* (2013.01); *H04W 88/16* (2013.01)

(58) Field of Classification Search
CPC ..... H04W 72/12; H04W 28/22; H04W 28/18; H04W 28/16
See application file for complete search history.

(56) References Cited

U.S. PATENT DOCUMENTS

| | | | |
|---|---|---|---|
| 9,794,047 B2 * | 10/2017 | Wang | H04L 5/0096 |
| 2009/0245108 A1 * | 10/2009 | Wu | H04L 47/10 370/233 |
| 2010/0041407 A1 * | 2/2010 | Caire | H04W 16/28 455/446 |

(Continued)

FOREIGN PATENT DOCUMENTS

| | | | |
|---|---|---|---|
| CN | WO 2013/053339 | * | 4/2013 |
| EP | 2106076 A1 | | 9/2009 |
| WO | WO-2013/135290 A1 | | 9/2013 |

OTHER PUBLICATIONS

3GPP TSG-RAN Meeting#58, Barcelona, Spain, Dec. 4-12, 2012, RP-122033, "New Study Item Description: Small Cell enhancements for E-UTRA and E-UTRAN—Higher-layer aspects", NTT Docomo Inc., 5 pgs.

(Continued)

*Primary Examiner* — Christopher M Crutchfield
*Assistant Examiner* — Tito Q Pham
(74) *Attorney, Agent, or Firm* — Harrington & Smith

(57) ABSTRACT

A method includes receiving at a first base station rate information dependent on communication between a user equipment and another base station and using said rate information to schedule communications between said first base station and said user equipment.

15 Claims, 6 Drawing Sheets

(56) References Cited

U.S. PATENT DOCUMENTS

| | | | | |
|---|---|---|---|---|
| 2010/0067435 A1* | 3/2010 | Balachandran | ....... | H04L 5/0035 370/328 |
| 2013/0176953 A1* | 7/2013 | Stern-Berkowitz | ......................... | H04W 52/281 370/329 |
| 2014/0153436 A1* | 6/2014 | Matsuo | .................. | H04B 7/024 370/253 |
| 2014/0286295 A1* | 9/2014 | Liu | ....................... | H04W 72/10 370/329 |
| 2014/0342748 A1* | 11/2014 | Zou | .................. | H04W 72/0426 455/452.1 |
| 2015/0110018 A1* | 4/2015 | Rosa | ................. | H04W 72/0426 370/329 |
| 2015/0351119 A1* | 12/2015 | Song | ................. | H04W 72/1268 370/329 |

OTHER PUBLICATIONS

3GPP TSG-RAN #61, Sep. 3-6, 2013, Porto, Portugal, RP-131274, "Way forward on SCE- Higher Layer SI", NTT Docomo, Inc. et. al., 2 pgs.

3GPP TSG RAN WG2 Meeting #81bis, Chicago, USA, Apr. 15-19, 2013, R2-131401, "Impacts of Splitting a Single EPS Bearer between Two (or more) eNBs", Intel Corporation, 9 pgs.

3GPP TS 23.401 V12.3.0 (Dec. 2013), "$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)", 302 pgs.

3GPP TR 36.842 V0.3.0 (Aug. 2013), "$3^{rd}$ Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 51 pgs.

* cited by examiner

METHOD, APPARATUS AND COMPUTER PROGRAM FOR SCHEDULING IN DUAL CONNECTIVITY SCENARIOS

Some embodiments may relate to a method, apparatus and computer program for use, for example in dual connectivity scenarios.

A communication system can be seen as a facility that enables communication sessions between two or more entities such as fixed or mobile communication devices, base stations, servers and/or other communication nodes. A communication system, and compatible communicating entities, typically operate in accordance with a given standard or specification which sets out what the various entities associated with the system are permitted to do and how that should be achieved. For example, the standards, specifications and related protocols can define the manner how various aspects of communication shall be implemented between communicating devices. A communication can be carried on wired or wireless carriers. In a wireless communication system at least a part of communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas. A radio service area is provided by a station. Radio service areas can overlap, and thus a communication device in an area can typically send signals to and receive signals from more than one station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station or an access point and/or another user equipment. The communication device may access a carrier provided by a station, for example a base station or an access node, and transmit and/or receive communications on the carrier.

An example of communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A communication system can comprise different types of radio service areas providing transmission/reception points for the users. For example, in LTE-Advanced the transmission/reception points can comprise wide area network nodes such as a macro eNode-B (eNB) which may, for example, provide coverage for an entire cell or similar radio service area. Network nodes can also be small or local radio service area network nodes, for example Home eNBs (HeNB), pico eNodeBs (pico-eNB), or femto nodes. Some applications utilise radio remote heads (RRH) that are connected to for example an eNB. The smaller radio service areas can be located wholly or partially within the larger radio service area. A user equipment may thus be located within, and thus communicate with, more than one radio service area. The nodes of the smaller radio service areas may be configured to support local offload. The local nodes can also, for example, be configured to extend the range of a cell.

According to an aspect, there is provided a method comprising: receiving at a first base station rate information dependent on communication between a user equipment and another base station; and using said rate information to schedule communications between said first base station and said user equipment.

The method may comprise using said rate information and an aggregate maximum bit rate associated with said user equipment to schedule said communications between said first base station and said user equipment.

The method may comprise scheduling said communications such that said aggregate maximum bit rate for said user equipment is not exceeded.

The rate information may comprise one or more of bit rate history, a duration associated with said bit rate and a bit rate value.

The bit rate value may comprise a limiting bit rate value and said using of said rate information comprises scheduling communications between said first base station and user equipment with a bit rate below said limiting bit rate value.

The received rate information may be associated with at least one of uplink and down link communications between said another base station and said user equipment.

The method may comprise using said rate information to schedule at least one of uplink and downlink communications between said first base station and said user equipment.

The method may comprise receiving said rate information from said another base station.

The method may comprise receiving said rate information from said another base station via a backhaul connection.

The method may comprise receiving said rate information from a serving gateway.

The user equipment may be in communication with said first base station and said another base station at the same time.

The method may be performed by an apparatus in the first base station.

According to another aspect, there is provided a method comprising: causing rate information dependent on communication between a user equipment and another base station to be provided to a first base station.

The method may comprise causing said rate information to be provided to said first base station in response to said rate information satisfying a criterion.

The criterion may comprise said rate information being above or below a value.

The rate information may comprise one or more of bit rate history, a duration associated with said bit rate and a bit rate value The method may be performed by an apparatus. The apparatus may be provided in the another base station or a serving gateway.

According to another aspect, there is provided a method comprising; determining in a serving gateway a rate of data addressed to the user equipment via a first base station and another base station and reducing said rate of data for said user equipment such that a maximum bit rate for said user equipment is not exceeded.

The method may reduce the rate of data by packet dropping.

The method may reduce the rate of data if the rate of data has exceeded the maximum bit rate for a given period of time, The method may be performed by an apparatus. The apparatus may be provided in a serving gateway.

According to another aspect, there is provided an apparatus in a first base station, said apparatus comprising at least one processor and at least one memory including computer code for one or more programs, the at least one memory and the computer code configured, with the at least one processor, to cause the apparatus at least to: receive rate information dependent on communication between a user equipment and another base station; and use said rate information to schedule communications between said first base station and said user equipment.

The at least one memory and the computer code may be configured, with the at least one processor, to use said rate information and an aggregate maximum bit rate associated with said user equipment to schedule said communications between said first base station and said user equipment.

The at least one memory and the computer code may be configured, with the at least one processor, schedule said communications such that said aggregate maximum bit rate for said user equipment is not exceeded.

The rate information may comprise one or more of bit rate history, a duration associated with said bit rate and a bit rate value.

The bit rate value may comprise a limiting bit rate value and the at least one memory and the computer code may be configured, with the at least one processor, to schedule communications between said first base station and user equipment with a bit rate below said limiting bit rate value.

The received rate information may be associated with at least one of uplink and down link communications between said another base station and said user equipment.

The at least one memory and the computer code may be configured, with the at least one processor to schedule at least one of uplink and downlink communications between said first base station and said user equipment.

The at least one memory and the computer code may be configured, with the at least one processor, to receive said rate information from said another base station.

The at least one memory and the computer code may be configured, with the at least one processor to receive said rate information from said another base station via a backhaul connection.

The at least one memory and the computer code may be configured, with the at least one processor, to receive said rate information from a serving gateway.

The user equipment may be in communication with said first base station and said another base station at the same time.

According to another aspect, there is provided an apparatus, said apparatus comprising at least one processor and at least one memory including computer code for one or more programs, the at least one memory and the computer code configured, with the at least one processor, to cause the apparatus at least to: cause rate information dependent on communication between a user equipment and another base station to be provided to a first base station.

The at least one memory and the computer code may be configured, with the at least one processor, to cause said rate information to be provided to said first base station in response to said rate information satisfying a criterion.

The criterion may comprise said rate information being above or below a value.

The rate information may comprise one or more of bit rate history, a duration associated with said bit rate and a bit rate value The apparatus may be provided in the another base station or a serving gateway.

According to another aspect, there is provided an apparatus in a serving gateway, said apparatus comprising at least one processor and at least one memory including computer code for one or more programs, the at least one memory and the computer code configured, with the at least one processor, to cause the apparatus at least to: determine in a serving gateway a rate of data addressed to the user equipment via a first base station and another base station; and reduce said rate of data for said user equipment such that a maximum bit rate for said user equipment is not exceeded.

The at least one memory and the computer code may be configured, with the at least one processor, to reduce the rate of data by packet dropping.

The at least one memory and the computer code may be configured, with the at least one processor, to reduce the rate of data if the rate of data has exceeded the maximum bit rate for a given period of time, The apparatus may be provided in a serving gateway.

According to an aspect, there is provided an apparatus in at first base station comprising: means for receiving rate information dependent on communication between a user equipment and another base station; and means for using said rate information to schedule communications between said first base station and said user equipment.

The using means may be for using said rate information and an aggregate maximum bit rate associated with said user equipment to schedule said communications between said first base station and said user equipment.

The using means may be for scheduling said communications such that said aggregate maximum bit rate for said user equipment is not exceeded.

The rate information may comprise one or more of bit rate history, a duration associated with said bit rate and a bit rate value.

The bit rate value may comprise a limiting bit rate value and said using means may be for scheduling communications between said first base station and user equipment with a bit rate below said limiting bit rate value.

The received rate information may be associated with at least one of uplink and down link communications between said another base station and said user equipment.

The using means may be for using said rate information to schedule at least one of uplink and downlink communications between said first base station and said user equipment.

The receiving means may be for receiving said rate information from said another base station.

The receiving means may be for receiving said rate information from said another base station via a backhaul connection.

The receiving means may be for receiving said rate information from a serving gateway.

The user equipment may be in communication with said first base station and said another base station at the same time.

According to another aspect, there is provided an apparatus comprising: means for causing rate information dependent on communication between a user equipment and another base station to be provided to a first base station.

The causing means may be for causing said rate information to be provided to said first base station in response to said rate information satisfying a criterion.

The criterion may comprise said rate information being above or below a value.

The rate information may comprise one or more of bit rate history, a duration associated with said bit rate and a bit rate value According to another aspect, there is provided an apparatus in a serving gateway comprising; means for determining a rate of data addressed to the user equipment via a first base station and another base station and means for reducing said rate of data for said user equipment such that a maximum bit rate for said user equipment is not exceeded.

The reducing means may be for reducing the rate of data by packet dropping.

The reducing may be for reducing the rate of data if the rate of data has exceeded the maximum bit rate for a given period of time, According to an aspect, there is provided a method comprising: assigning to a first base station a subset of a limit to a total bit rate that should be scheduled to a user equipment; and transmitting an indication of said assignment to a second base station.

The second base station may be the same as the first base station

According to another aspect, there is provided an apparatus comprising: means for assigning to a first base station a subset of a limit to a total bit rate that should be scheduled to a user equipment; and means for transmitting an indication of said assignment to a second base station.

The second base station may be the same as the first base station

According to another aspect, there is provided an apparatus, said apparatus comprising at least one processor and at least one memory including computer code for one or more programs, the at least one memory and the computer code configured, with the at least one processor, to cause the apparatus at least to: assign to a first base station a subset of a limit to a total bit rate that should be scheduled to a user equipment; and transmit an indication of said assignment to a second base station.

The second base station may be the same as the first base station

According to another aspect there is provided a computer program comprising computer executable instructions which when run on one or more processors perform the method as discussed above.

Some embodiments will now be described by way of example only with reference to the accompanying figures in which.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 and 2 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Figure 1:
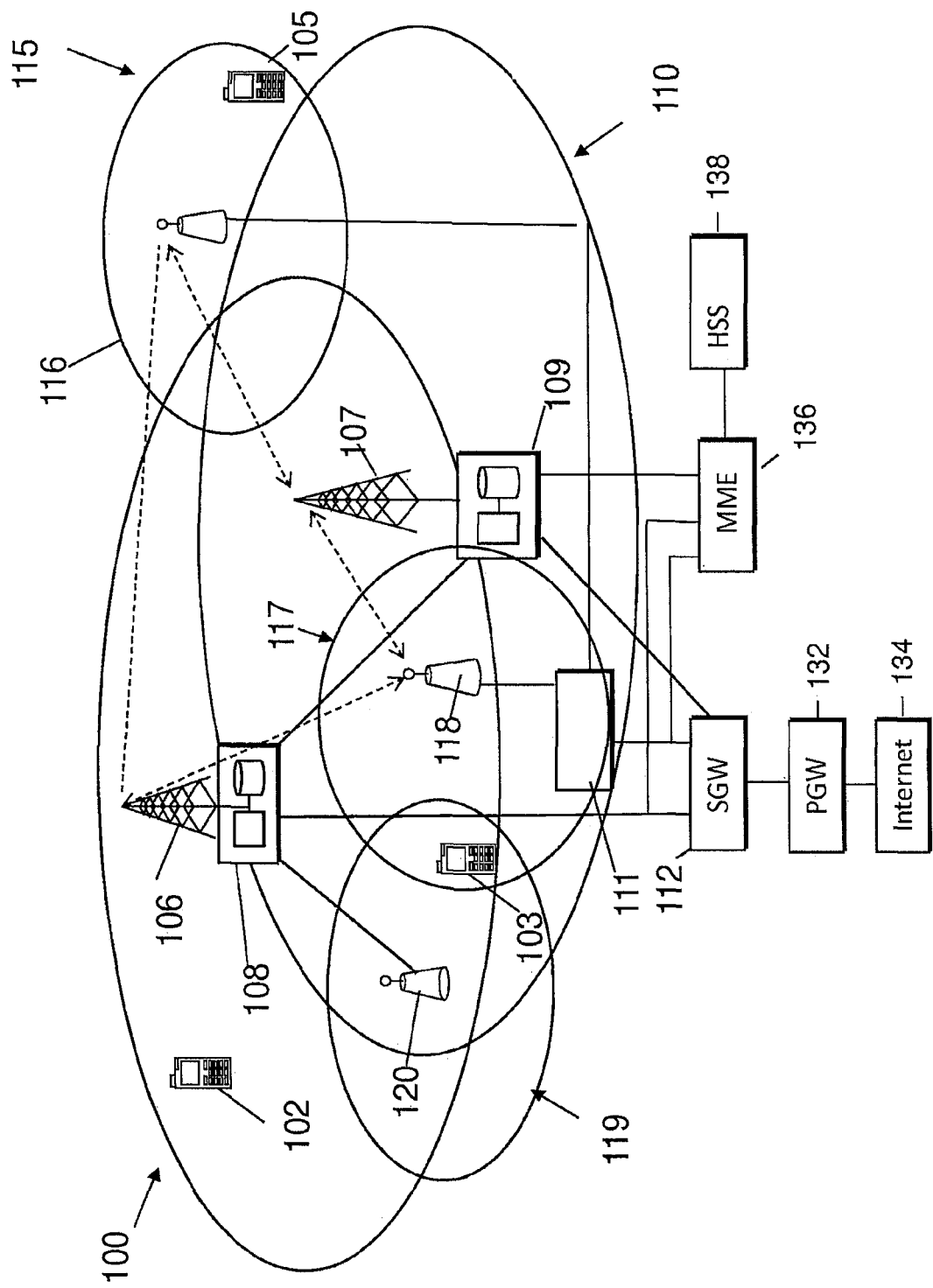
FIG. 1 shows a schematic diagram of a network according to some embodiments.
Figure 3:
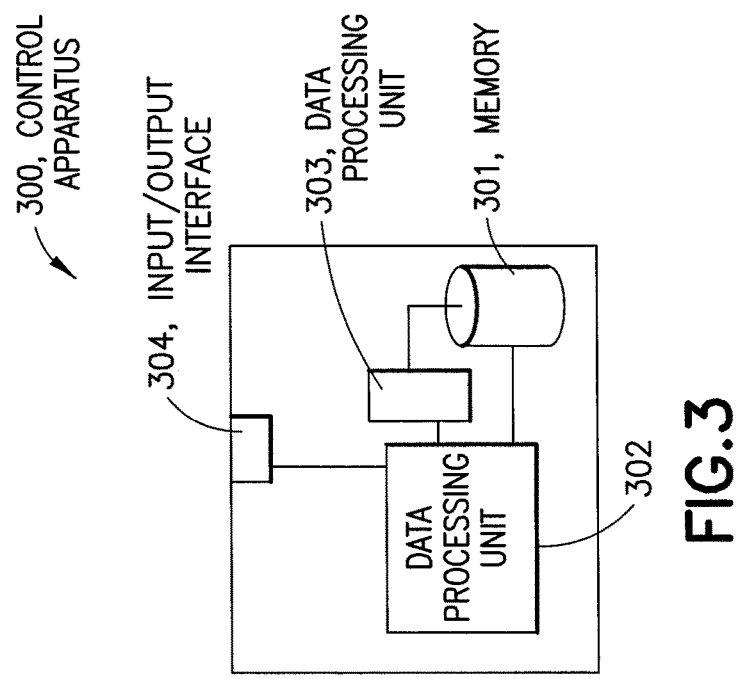
FIG. 3 shows a schematic diagram of a control apparatus according to some embodiments.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. The control apparatus may be as shown in FIG. 3 which is discussed later.

In FIG. 1 stations 106 and 107 are shown as connected to a serving gateway (SGW) 112. The smaller stations 116, 118 and 120 are connected to a further gateway function 111 which is connected to the S-GW 112. In some embodiments, the further gateway function 111 is omitted. The S-GW 112 may be connected to, for example, the internet 134 via a PGW (PDN (packet data network) gateway) 132.

The base stations are also connected to a MME 136 (mobility management entity) which in turn is connected to a HSS (home subscriber server) 138.

Figure 2:
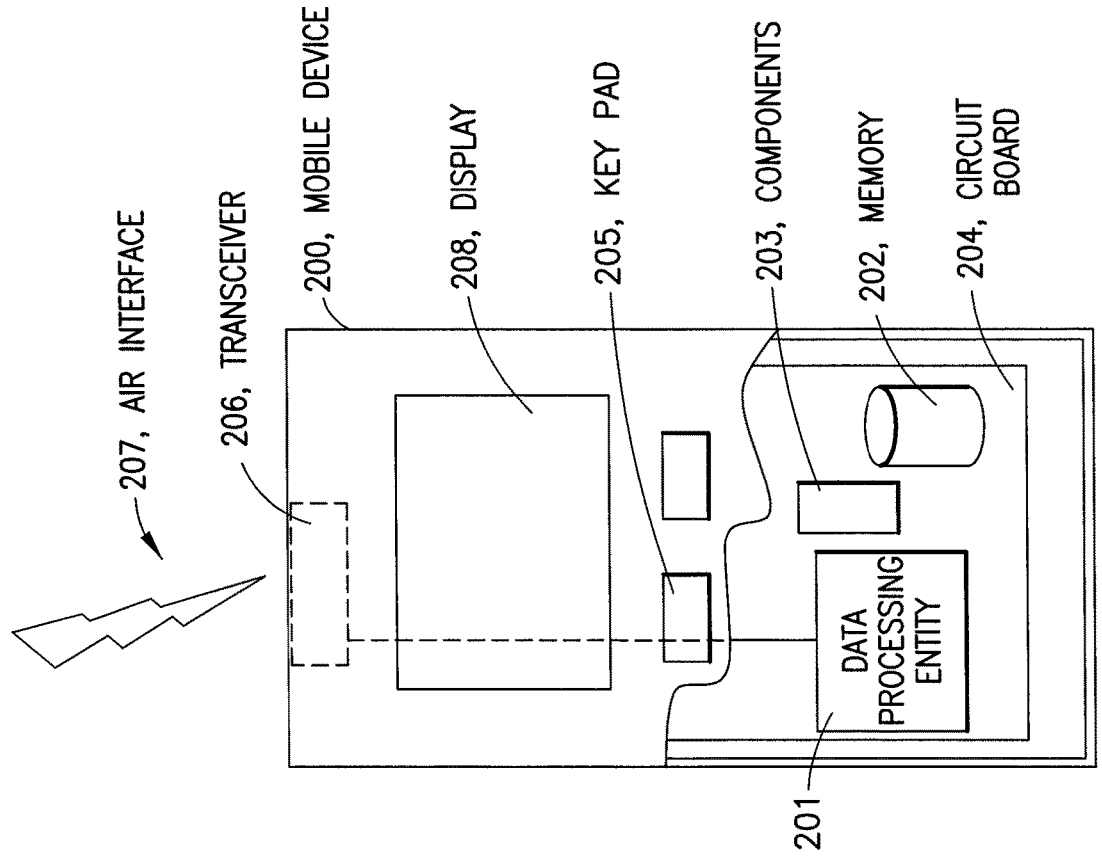
FIG. 2 shows a schematic diagram of a mobile communication device according to some embodiments.

A possible mobile communication device for transmitting and retransmitting information blocks towards the stations of the system will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information. The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with Tx antenna numbers or port numbers of MIMO arrangements.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

FIG. 3 shows an example of a control apparatus. The control apparatus 300 can be configured to provide control functions. For this purpose the control apparatus 300 comprises at least one memory 301, at least one data processing unit (or processor or microprocessor) 302, 303 and an input/output interface 304. The control apparatus 300 can be configured to execute an appropriate software code to provide the control functions.

The control apparatus may be provided in a base station. In that case, via the interface the control apparatus may be coupled to a receiver and a transmitter. The receiver and/or transmitter may be part of a base station. That is the apparatus may comprise means for receiving and means for sending/transmitting.

The control apparatus may alternatively or additionally be provided elsewhere in the system, for example in the S-GW.

Although FIG. 3 shows one memory 301 and two processors 302 and 303, any number of these components may be provided. Multiple functions may be carried out in a single processor, or separate functions may be carried out by separate processors. For example a single processor may be used to make multiple determinations, or separate determinations may be made by separate processors.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Figure 4:
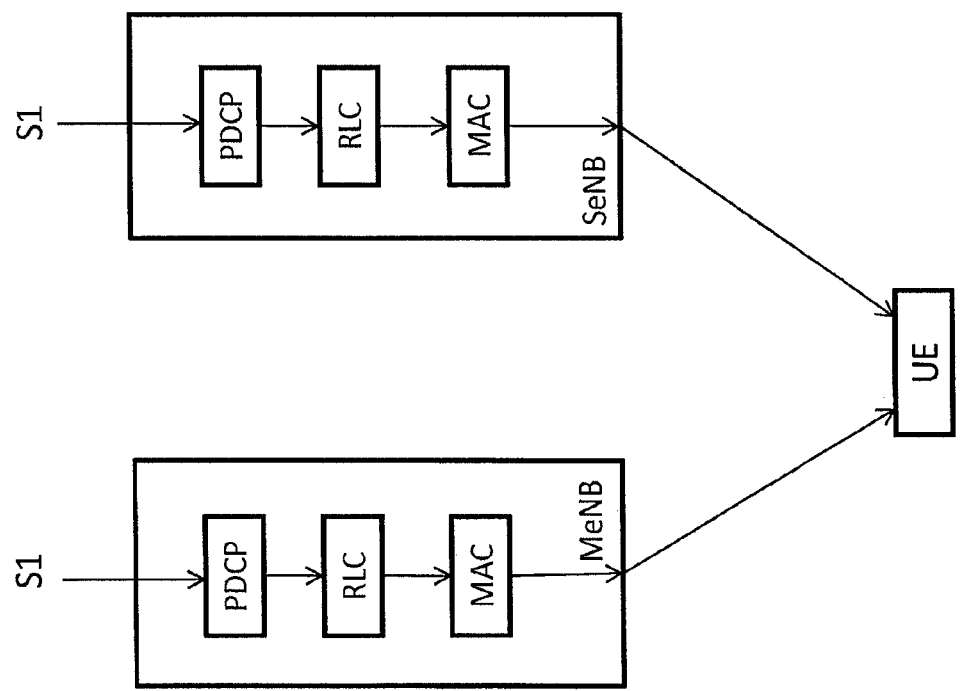
FIG. 4 shows a first example of a UE connected to two base stations.

Reference is made to FIG. 4 which shows a first arrangement. In this arrangement, a user equipment UE is arranged to receive communications from two eNode Bs. The communication is done via bearers that are established between UE and PGW through the SGW, with the eNB routing the traffic between the SGW and UE. In this example, the first eNode B is referred to as a MeNode B (the master eNode B). In some embodiments, the master eNode B is the eNode B which terminates at least the S1-MME for a given UE and may act as a mobility anchor towards the core network. The MeNB may always have at least one bearer established for a given UE—this may be mandatory since the SRBs (signalling radio bearers) always go to MeNB, in some systems. However, DRBs (data radio bearer) may all be offloaded to SeNB.

The second eNode B is the SeNode B (secondary eNode B) which provides additional radio resources for the user equipment and which is not the master eNode B.

In some embodiments, dual connectivity is provided where a given user equipment consumes radio resources provided by at least two different network points (e.g. the master and secondary eNode Bs).

Each of the node Bs in FIG. 4 comprises a PDCP (packet data convergence protocol layer), a RLC (radio link control) layer and a MAC (medium access control) layer.

In the arrangement of FIG. 4, also the secondary eNode B terminates S1-U interface for the UE in question, and there are independent PDCP layers in the two base stations. Thus, in some embodiments there may be no bearer split. With this arrangement, there may be no need for the master eNode B to buffer or process packets for an EPS (evolved packet system) bearer transmitted by the secondary eNode B.

Thus the arrangement of FIG. 4 entails a UE being simultaneously served by two eNode Bs, with each eNode B serving their own separate EPS bearers of the UE, such that the nearest network-side aggregation point for all the EPS bearers of the UE is the Serving gateway i.e. outside E-UTRAN (evolved UMTS (universal mobile telecommunications system) terrestrial radio access network.

There may be no need to route traffic to the master eNode B which means that there are low requirements for the backhaul link between the two base stations and there may be no requirement for flow control.

The arrangement shown in FIG. 4 may support local break out and content caching at the secondary eNode B in a straightforward manner.

Figure 5:
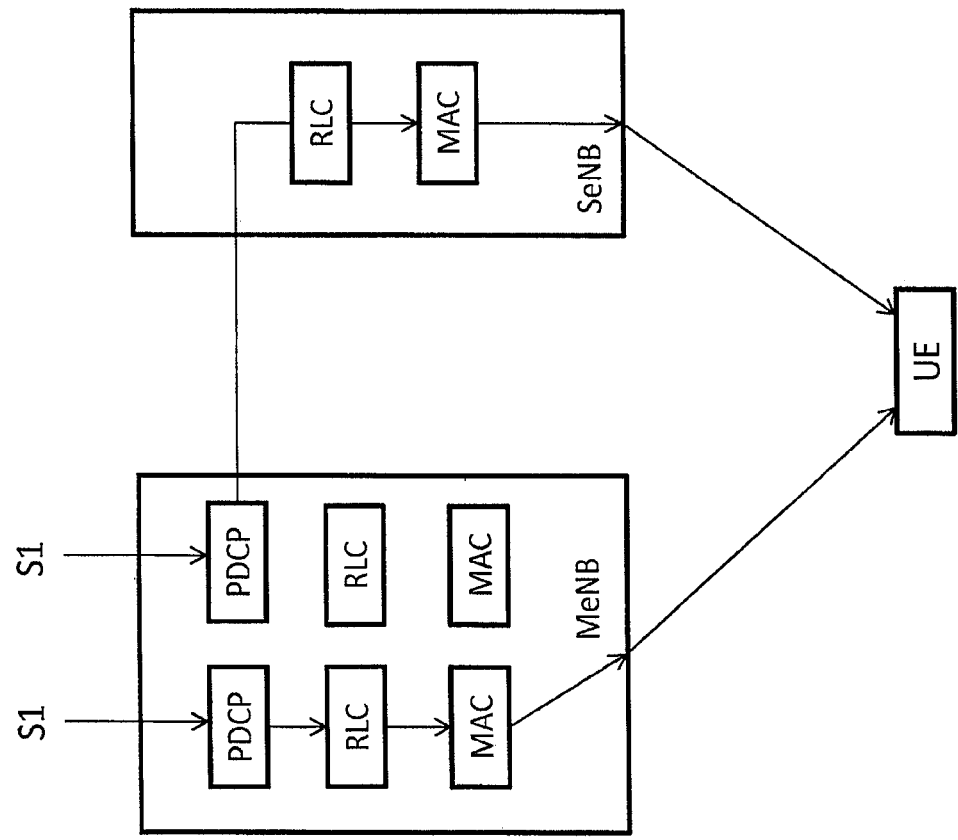
FIG. 5 shows a second example of a UE connected to two base stations.

Reference is made to FIG. 5 which shows an alternative arrangement to that shown in FIG. 4. In this embodiment, only the master eNode B terminates S1-U interface for the UE in question. There is, however, a bearer split in the master eNode B (also a non-split bearer is shown for completeness). However, both of the base stations have independent RLC layers for a split bearer. Thus, in the arrangement shown in FIG. 5, the data stream for a split bearer is received at the master eNode B. One part of the stream is passed by the RLC and MAC layers to the user equipment and the other part is passed by a back haul connection between the master eNode B and secondary eNode B to the RLC layer of the secondary eNode B. The stream then passes through the MAC layer of the secondary eNode B to the user equipment UE. The data is received from an S-GW.

The E-UTRAN may have one or more of the following functions.

Each UE in an EMM (EPS mobility management) registered state may be associated with the bearer aggregate level QoS (quality of service) parameter of per UE Aggregate Maximum Bit Rate (UE-AMBR). The UE-AMBR may consist of separate rate enforcement parameters for UL and DL. The UL and DL bearer level rate enforcement may be based on UE-AMBR (per UE aggregate maximum bit rate) and MBR (maximum bit rate) via means of uplink and downlink scheduling. This may be achieved by limiting the amount of UL and DL resources granted per UE over time.

UE-AMBR may be limited or controlled or defined by a subscription parameter stored in the HSS (home subscriber server). The MME (mobility management entity) shall set the UE-AMBR to the sum of the APN (access point name)—AMBR of all active APNs up to the value of the subscribed UE-AMBR. The UE-AMBR limits the aggregate bit rate that can be expected to be provided across all Non-GBR (non-guaranteed bit rate) bearers of a UE. For example, excess traffic may get discarded by a rate shaping function. This means that if the network or the UE tries to send more traffic than is allowed by the UE-AMBR, the SGW may discard the traffic. This is one example of how the SGW would implement rate enforcement. Each of those Non-GBR bearers could potentially utilize the entire UE-AMBR. For example, this may occur when the other Non-GBR bearers do not carry any traffic. GBR bearers may be outside the scope of UE AMBR.

The E-UTRAN may enforce the UE-AMBR in uplink and downlink. Where a UE is only served by a single eNode B, UE-AMBR enforcement may be a straightforward, locally performed scheduling task. For example, current carrier aggregation or CoMP (coordinated multipoint) proposals assume that S1-U is routed from a single point (i.e. the eNB controlling the CA or CoMP operation).

With the arrangement of FIG. 4, a problem may arise with the rate enforcement of UE-AMBR. This is because all the EPS bearers of the UE are not served by a single eNB. Thus the knowledge of the aggregate data rate scheduled to a UE is not co-located in a single location. This applies for both uplink and downlink traffic.

With the arrangement of FIG. 5, where all the EPS bearers of the UE traverse the master eNode B, the Master eNode B will schedule all downlink traffic to the UE (for transmission either over its own radio or via the Secondary eNode B). Assuming that any eNB serving a UE is informed of the UE-AMBR and avoids scheduling the UE beyond the limits defined by UE-AMBR, the Master eNode B can control its own uplink scheduling of the UE so that the uplink UE-AMBR is not exceeded based on the uplink traffic received from the Secondary eNode B. However, this may effectively limit the MeNode B more than the SeNode B. This is because the MeNode B reacts to what SeNode B does so that MeNode B may not be in control. This may not be desirable in some situations.

Some embodiments may transfer history information of UE bitrates and/or indicate bitrate limits which an eNode B takes into account when scheduling in relation to a UE. It should be appreciated that any suitable bit rate information may be provided. The information may be the bit rate itself, information from which the bit rate may be determined, history of experienced bitrates over a time interval, information indicating a band in which said bit rate falls, information indication by how much the bit rate has changed as compared to previously provided information, a maximum bit rate, an average of a previously used bit rate, a bit rate which is available for the base station.

Some embodiments may provide an enforcement point for DL AMBR.

Some embodiments may provide signalling or information indicating to an eNode B a past bitrate history and/or one or more bitrate limits to apply in scheduling the UE, in UL and/or DL.

Some embodiments may enable rate enforcement of UE-AMBR in the option shown in FIG. 4 and/or the option shown in FIG. 5.

To enable rate enforcement of UE-AMBR in the one or other of the options shown in FIGS. 4 and/or 5 may comprise one or more of the following. It should be appreciated that one or more of the following alternatives may be separately and independently applicable to rate enforcement in the uplink and the downlink.

Figure 6:
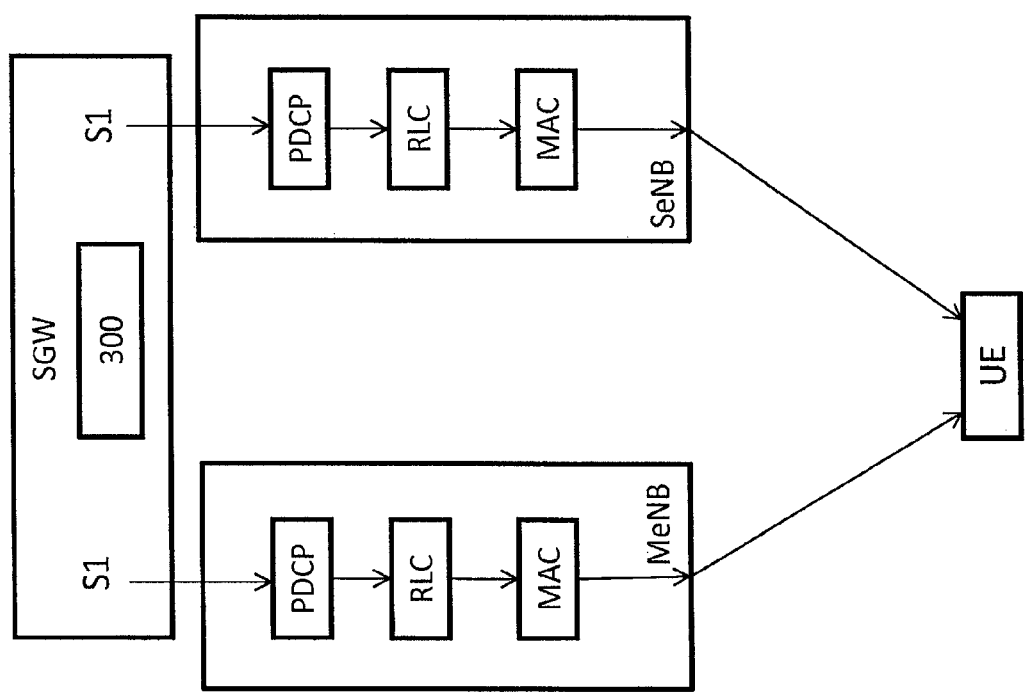
FIG. 6 shows a modification to the example shown in FIG. 4.

Reference is made to FIG. 6, which shows a modification as compared to the arrangement of FIG. 4. The arrangement may be used for rate enforcement of the downlink.

The responsibility of rate enforcement may be provided at a single aggregation point of all the EPS bearers of the UE. For example, the aggregation point for the arrangement of FIG. 6 would be the serving gateway S-GW.

This would require the storage of the UE-AMBR and rate enforcement of the UE-AMBR within a control apparatus 300 in the SGW. The storage of UE-AMBR information would be in at least one of the at least one memories 301. The rate enforcement would be provided by the at least one data processing unit. The rate enforcement within the SGW may provide a second layer of rate monitoring in addition to the APN specific rate monitoring performed within the PGW. The control apparatus may measure the rate of data addressed to the UE and falling within scope of UE-AMBR, and determine if the rate is within UE-AMBR. The control apparatus may reduce the rate by packet dropping if that rate exceeds the set UE-AMBR limit for an extended period of time, For rate enforcement in the uplink, rate enforcement within the SGW may not be practical in some embodiments because it would allow the eNode Bs serving the UE to first independently spend radio resources to schedule the UE in uplink after which, if the UE-AMBR was exceeded, the SGW would drop some of the data, meaning that some uplink radio resources were wasted. However, it should be appreciated that in some embodiments, uplink rate enforcement may be advantageous.

For the arrangement of FIG. 5, the single aggregation point would be the MeNode B.

In another embodiment for uplink and/or downlink in the arrangement of FIGS. 4 and/or 5 one of the eNode Bs serving the UE receives bit rate information. In some embodiments, this bit rate information may comprise signaling information of past bit rates scheduled to the UE (in uplink, or downlink, or both). In some embodiments, this may be provided with information indicating the duration of time over which that bit rate applied and/or was averaged. In should be appreciated that alternatively or additionally, any other suitable bit rate information may be used.

Such information may be received directly from the other eNode B serving the same UE. In that case, the indicated bit rate may be that scheduled by that eNode B. This information may be received via a backhaul communication path Alternatively or additionally such information may be provided by the SGW. In this embodiment, the bit rate may be one or more of the uplink bit rate scheduled by the other eNode B, the downlink bit rate and the uplink bit rate summed over both the eNode Bs. The eNode B receiving such information would take that information into account in its own scheduling, so as not to exceed the UE-AMBR.

In some embodiments this may be used for rate enforcement in the uplink. However, alternative embodiments may use this information for down link rate enforcement in addition or in the alternative.

In another embodiment for uplink and/or downlink, in the arrangement of FIGS. 4 and/or 5, one of the eNode Bs receives information about a rate limit to be used for AMBR rate enforcement in the UL and/or the DL. That eNode B may ensure no higher UL and/or DL bit rate is scheduled.

In some of embodiments, as an alternative to history information or in addition, information about a limit may be provided. Instead of or as well as history information, limits to scheduling may be indicated to the other eNB. Other embodiments may additionally or alternatively use any other suitable bit rate information.

In another embodiment, information about indicated limits would define to the eNode B, conditions as to when to provide signaling information of past scheduled bit rate(s) to the other eNode B. This may be, for example, whenever the scheduled bit rate has been below X and/or above Y.

In some embodiments, an eNode B may request bit rate information from one or more of a SGW and another eNode B. The request may be triggered by an event or may be periodically sent. The event may be any suitable event and may be dependent on cell loading and/or quantity of traffic associated with a UE.

The signalling information of past scheduled bit rate(s) and/or of a AMBR limitation may be transferred directly between the eNode Bs, and/or over the X2 interface, and/or any other suitable interface for information transferred directly between the eNode Bs, and/or the S1-U interface if the information is received from the SGW.

Figure 7:
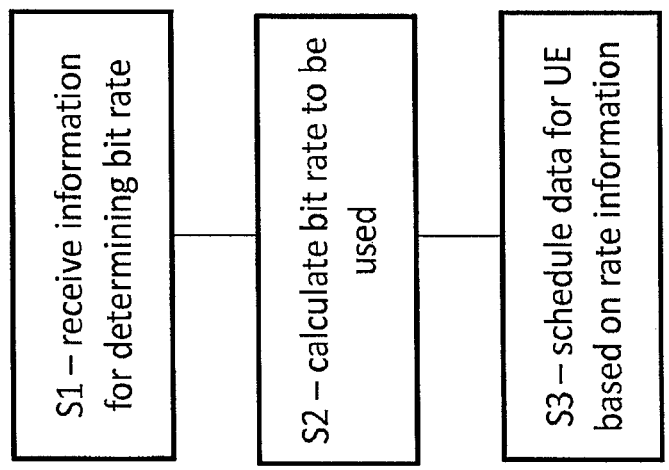
FIG. 7 shows a method of an embodiment.

Reference is made to FIG. 7 which shows a method of an embodiment. The method shown in FIG. 7 may be performed in an eNode B. The eNode B may receive in step S1 information for determining the bit rate. This information may be as discussed in any of the above embodiments. For example, the information may be received from the SGW and/or another eNode B.

In step S2, the eNode B may calculate a bit rate to be used for communication between the eNode B and the user equipment. It should be appreciated that this may be used to calculate an uplink bit rate and/or a down link data rate. This may use the UE-AMBR.

In step S3, the eNode B will schedule uplink and/or downlink communication for the user equipment based on the calculated bit rate.

It should be appreciated that in some embodiments, step S2 may be omitted if the received information provides the bit rate itself to be used.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
   receiving, at a first base station, rate information dependent on communication between a user equipment and another base station;
   wherein the rate information includes an assignment of a subset of a limit to a total bit rate that should be scheduled to the user equipment;
   wherein the rate information further includes information of past scheduled bit rates to the user equipment, the past scheduled bit rates having been scheduled based on control from the another base station between the another base station and the user equipment;
   wherein the rate information further comprises one or more of bit rate history, a duration associated with said bit rate and a bit rate value;
   scheduling communications between the first base station and the user equipment using the rate information and an aggregate maximum bit rate associated with the user equipment, such that the aggregate maximum bit rate associated with the user equipment is not exceeded; and
   in response to the first base station not being configured to serve an uplink for a split bearer, disregarding the assignment of the subset of the limit to the total bit rate that should be scheduled to the user equipment.

2. A method as claimed in claim 1, wherein said bit rate value comprises a limiting bit rate value and said using of said rate information comprises scheduling communications between said first base station and user equipment with a bit rate below said limiting bit rate value.

3. A method as claimed in claim 1, wherein said received rate information is associated with at least one of uplink or downlink communications between said another base station and said user equipment.

4. A method as claimed in claim 1, comprising receiving said rate information from said another base station in response to said rate information satisfying a criterion, wherein said criterion comprises said rate information being above or below a predetermined value.

5. A method as claimed in claim 1, comprising receiving said rate information from said another base station via a backhaul connection.

6. A method as claimed in claim 1, comprising receiving said rate information from a serving gateway.

7. A method as claimed in claim 1, wherein said user equipment is in communication with said first base station and said another base station in multi-connectivity.

8. The method of claim 1, wherein the scheduling of communications between the first base station and the user equipment using the rate information and the aggregate maximum bit rate associated with the user equipment is performed for non-guaranteed bit rate bearers.

9. The method of claim 1, wherein the aggregate maximum bit rate associated with the user equipment is based on information provided from a mobility management entity.

10. The method of claim 1, wherein the scheduling of communications between the first base station and the user equipment using the rate information and the aggregate maximum bit rate associated with the user equipment, such that the aggregate maximum bit rate associated with the user equipment is not exceeded is performed based on control from a serving gateway.

11. The method of claim 1, wherein the scheduling of communications between the first base station and the user equipment using the rate information and the aggregate maximum bit rate associated with the user equipment is such that the aggregate maximum bit rate associated with the user equipment is not exceeded in both uplink and downlink.

12. A method comprising:
causing rate information associated with communication between a user equipment and another base station to be provided from the another base station to a first base station serving the user equipment, in response to said rate information satisfying a criterion, wherein said criterion comprises said rate information being above or below a predetermined value;
wherein the rate information includes an assignment of a subset of a limit to a total bit rate that should be scheduled to the user equipment;
wherein the rate information further includes information of past scheduled bit rates to the user equipment, the past scheduled bit rates having been scheduled based on control from the another base station between the another base station and the user equipment;
wherein the rate information further comprises one or more of bit rate history, a duration associated with said bit rate and a bit rate value;
scheduling communications between the first base station and the user equipment using the rate information and an aggregate maximum bit rate associated with the user equipment, such that the aggregate maximum bit rate associated with the user equipment is not; and
in response to the first base station not being configured to serve an uplink for a split bearer, disregarding the assignment of the subset of the limit to the total bit rate that should be scheduled to the user equipment.

13. A method comprising:
assigning, via a first base station, to the first base station a subset of a limit to a total bit rate that should be scheduled to a user equipment;
wherein rate information includes information related to the assignment;
wherein the rate information further includes information of past scheduled bit rates to the user equipment, the past scheduled bit rates having been scheduled based on control from the first base station between the first base station and the user equipment;
wherein the rate information further comprises one or more of bit rate history, a duration associated with said bit rate and a bit rate value; and
transmitting, via the first base station, the rate information having an indication of said assignment and the past scheduled bit rates to the user equipment to a second base station in response to said rate information satisfying a criterion, wherein said criterion comprises said rate information being above or below a predetermined value;
wherein communications are scheduled, based on control from the second base station, between the second base station and the user equipment using the rate information and an aggregate maximum bit rate associated with the user equipment;
wherein, in response to the second base station not being configured to serve an uplink for a split bearer, the assignment of the subset of the limit to the total bit rate that should be scheduled to the user equipment is disregarded.

14. A computer program product embodied on a non-transitory computer-readable medium in which a computer program is stored that, when being executed with a computer, is configured to provide instructions for:
receiving, at a first base station from another base station, rate information dependent on communication between a user equipment and the another base station in response to said rate information satisfying a criterion, wherein said criterion comprises said rate information being above or below a predetermined value;
wherein the rate information includes an assignment of a subset of a limit to a total bit rate that should be scheduled to the user equipment;
wherein the rate information further includes information of past scheduled bit rates to the user equipment, the past scheduled bit rates having been scheduled based on control from the another base station between the another base station and the user equipment;
wherein the rate information further comprises one or more of bit rate history, a duration associated with said bit rate and a bit rate value;
scheduling communications between the first base station and the user equipment using the rate information and an aggregate maximum bit rate associated with the user equipment, such that the aggregate maximum bit rate associated with the user equipment is not exceeded; and
in response to the first base station not being configured to serve an uplink for a split bearer, disregarding the assignment of the subset of the limit to the total bit rate that should be scheduled to the user equipment.

15. An apparatus in a first base station, said apparatus comprising at least one processor and at least one non-transitory memory including computer code for one or more programs, the at least one memory and the computer code configured, with the at least one processor, to cause the apparatus at least to:
receive rate information from another base station dependent on communication between a user equipment and the another base station in response to said rate information satisfying a criterion, wherein said criterion comprises said rate information being above or below a predetermined value;
wherein the rate information includes an assignment of a subset of a limit to a total bit rate that should be scheduled to the user equipment;
wherein the rate information further includes information of past scheduled bit rates to the user equipment, the past scheduled bit rates having been scheduled based on control from the another base station between the another base station and the user equipment;
wherein the rate information further comprises one or more of bit rate history, a duration associated with said bit rate and a bit rate value;
schedule communications between the first base station and the user equipment using the rate information and an aggregate maximum bit rate associated with the user equipment, such that the aggregate maximum bit rate associated with the user equipment is not exceeded; and in response to the first base station not being configured to serve an uplink for a split bearer, disregard the assignment of the subset of the limit to the total bit rate that should be scheduled to the user equipment.

* * * * *